United States Patent
Takeda et al.

(10) Patent No.: US 11,646,933 B2
(45) Date of Patent: May 9, 2023

(54) TERMINAL, RADIO COMMUNICATION METHOD, AND BASE STATION

(71) Applicant: NTT DOCOMO, INC., Tokyo (JP)

(72) Inventors: Kazuki Takeda, Tokyo (JP); Hideaki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 119 days.

(21) Appl. No.: 16/980,170

(22) PCT Filed: Mar. 13, 2018

(86) PCT No.: PCT/JP2018/009812
§ 371 (c)(1),
(2) Date: Sep. 11, 2020

(87) PCT Pub. No.: WO2019/175989
PCT Pub. Date: Sep. 19, 2019

(65) Prior Publication Data
US 2021/0028979 A1 Jan. 28, 2021

(51) Int. Cl.
*H04L 41/0803* (2022.01)
*H04W 72/23* (2023.01)

(52) U.S. Cl.
CPC ......... *H04L 41/0803* (2013.01); *H04W 72/23* (2023.01)

(58) Field of Classification Search
CPC .......... H04L 41/0803; H04W 72/042
See application file for complete search history.

(56) References Cited

U.S. PATENT DOCUMENTS

| 9,609,642 B2 | 3/2017 | Xia et al. |
| 2018/0227777 A1* | 8/2018 | Sun ............... H04W 52/0212 |
| 2019/0021119 A1* | 1/2019 | Ng ................. H04W 48/10 |
| 2019/0158205 A1* | 5/2019 | Sheng ............. H04L 5/0094 |
| 2019/0253966 A1* | 8/2019 | Park ............... H04W 28/0221 |
| 2019/0306888 A1 | 10/2019 | Takeda et al. |

FOREIGN PATENT DOCUMENTS

WO   2018-012619 A1   1/2018

OTHER PUBLICATIONS

Extended European Search Report issued in counterpart European Application No. 18910045.6 dated Sep. 27, 2021 (6 pages).
Samsung; "Summary of 7.1.1.2.3 Other system information delivery"; 3GPP TSG RAN WG1 Meeting #92, R1-1803468; Athens, Greece, Feb. 26-Mar. 2, 2018 (9 pages).

(Continued)

Primary Examiner — Duc C Ho
(74) Attorney, Agent, or Firm — Osha Bergman Watanabe & Burton LLP

(57) ABSTRACT

A terminal is disclosed including a receiver that receives configuration information comprising control resource set (CORESET) configuration information, the configuration information being used for configuring a cell-specific parameter for a downlink control channel; and a processor that determines a CORESET based on the CORESET configuration information. In other aspects, a radio communication method and a base station are also disclosed.

9 Claims, 8 Drawing Sheets

(56) References Cited

OTHER PUBLICATIONS

Ericsson; "CSI-MeasConfig signalling structure" 3GPP TSG-RAN WG2#101, Tdoc R2-1 803961; Athens, Greece, Feb. 26-Mar. 2, 2018 (39 pages).
International Search Report for corresponding International Application No. PCT/JP2018/009812, dated Jun. 5, 2018 (5 pages).
Written Opinion for corresponding International Application No. PCT/JP2018/009812, dated Jun. 5, 2018 (3 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).
Office Action in counterpart Japanese Patent Application No. 2020-506004 dated Mar. 22, 2022 (8 pages).
Intel Corporation; "CORESETs and search spaces in NR"; 3GPP TSG RAN WG1 #91 bis, R1-1717379; Prague, Czech Republic; Oct. 9-13, 2017 (11 pages).
Sony; "Remaining details on remaining minimum system information"; 3GPP TSG RAN WG1 Meeting NR#3, R1-1718664; Prague, Czech Republic; Oct. 9-13, 2017 (4 pages).
Ericsson; "Remaining details on paging design"; 3GPP TSG RAN1 WG1 Meeting #91, R1-1720939; Reno, Nevada Nov. 27-Dec. 1, 2017 (7 pages).
Xiaomi; "Discussion on the CORESET configuration"; 3GPP TSG RAN WG1 Meeting NR#3, R1-1716564; Nagoya, Japan; Sep. 18-21, 2017 (3 pages).
H. Huawei; "Offline discussion for BWP"; 3GPP TSG-RAN WG2 Meeting #100, R2-1714182; Reno, USA; Nov. 27-Dec. 1, 2017 (11 pages).
Office Action issued in Indian Application No. 202037042609 dated Jul. 15, 2022 (8 pages).

\* cited by examiner

FIG. 1 (PRIOR ART)

Control Resource Set information element

```
-- ASN1START
-- TAG-CONTROLRESOURCESET-START

ControlResourceSet ::=              SEQUENCE {
    -- Corresponds to L1 parameter 'CORESET-ID'
    -- Value 0 identifies the common CORESET configured in MIB and in ServingCellConfigCommon
    -- Values 1..maxNrofControlResourceSets-1 identify CORESETs configured by dedicated signalling
    -- The controlResourceSetId is unique among the BWPs of a ServingCell.
    controlResourceSetId              ControlResourceSetId, -- Frequency domain resources for the CORESET. Each bit corresponds a group of 6 RBs, with grouping starting from PRB 0, which is fully
    -- contained in the bandwidth part within which the CORESET is configured.
    -- The most significant bit corresponds to the group of lowest frequency which is fully contained in the bandwidth part within which the
    -- CORESET is configured, each next subsequent lower significance bit corresponds to the next lowest frequency group fully contained within
    -- the bandwidth part within which the CORESET is configured, if any.
    -- Bits corresponding to a group not fully contained within the bandwidth part within which the CORESET is configured are set to zero.
    -- Corresponds to L1 parameter 'CORESET-freq-dom'(see 38.211, section 7.3.2.2)
    frequencyDomainResources          BIT STRING (SIZE (45)), -- Contiguous time duration of the CORESET in number of symbols
    -- Corresponds to L1 parameter 'CORESET-time-duration' (see 38.211, section 7.3.2.2FFS_Section)
    duration                          INTEGER (1..maxCoReSetDuration), -- Mapping of Control Channel Elements (CCE) to Resource Element Groups (REG).
    -- Corresponds to L1 parameter 'CORESET-CCE-REG-mapping-type' (see 38.211Section sections 7.3.2.2 and 7.4.1.3.2)
    cce-REG-MappingType               CHOICE {
        interleaved                       SEQUENCE {
            -- Resource Element Groups (REGs) can be bundled to create REG bundles. This parameter defines the size of such bundles.
            -- Corresponds to L1 parameter 'CORESET-REG-bundle-size' (see 38.211, section FFS_Section)
            reg-BundleSize                    ENUMERATED {n2, n3, n6},
            -- Corresponds to L1 parameter 'CORESET-interleaver-size' (see 38.211, 38.213, section FFS_Section)
            interleaverSize                   ENUMERATED {n2, n3, n6},
            -- Corresponds to L1 parameter 'CORESET-shift-index' (see 38.211, section 7.3.2.2)
            shiftIndex                        INTEGER(0..maxNrofPhysicalResourceBlocks-1)
        },
        nonInterleaved                    NULL
    }, -- Precoder granularity in frequency domain.
    -- Corresponds to L1 parameter 'CORESET-precoder-granuality' (see 38.211, sections 7.3.2.2 and 7.4.1.3.2)
    precoderGranularity               ENUMERATED {sameAsREG-bundle, allContiguousRBs}, -- A subset of the TCI states defined in TCI-States used for providing QCL relationships between the DL RS(s) in one RS Set
    -- (TCI-State) and the PDCCH DMRS ports. Corresponds to L1 parameter 'TCI-StatesPDCCH' (see 38.214, section FFS_Section)
    tci-StatesPDCCH                   SEQUENCE(SIZE (1..maxNrofTCI-StatesPDCCH)) OF TCI-StateId          OPTIONAL, -- Need R -- If at least spatial QCL is configured/indicated, this field indicates if TCI field is present or not present in DL-related DCI.
    -- When the field is absent the UE considers the TCI to be absent/disabled.
    -- Corresponds to L1 parameter 'TCI-PresentInDCI' (see 38.213, section 5.1.5)
    tci-PresentInDCI                  ENUMERATED {enabled}                                               OPTIONAL, -- Need S -- PDCCH DMRS scrambling initalization. Corresponds to L1 parameter 'PDCCH-DMRS-Scrambling-ID' (see 38.214, section 5.1)
    -- When the field is absent the UE applies the value '0'.
    pdcch-DMRS-ScramblingID           BIT STRING (SIZE (16))                                             OPTIONAL -- Need S
}

-- TAG-CONTROLRESOURCESET-STOP
-- ASN1STOP
```

PDCCH-ConfigCommon information element

```
-- ASN1START
-- TAG-PDCCH-CONFIGCOMMON-START

PDCCH-ConfigCommon ::=         SEQUENCE {

-- A list of additional common search spaces.
commonSearchSpaces              SEQUENCE (SIZE(1..3)) OF SearchSpace                          OPTIONAL, -- Need R -- A list of additional control set resources; One is for SIB1, Other System Information and
paging. The other is for Random Access.
controlResourceSets             SEQUENCE (SIZE (1..2)) OF ControlResourceSet     OPTIONAL, -- ID of the search space for SIB1 message.
-- Corresponds to L1 parameter 'rmsi-SearchSpace' (see 38.213, section 10)
searchSpaceSIB1                 SearchSpaceId                                                 OPTIONAL, -- Need R
-- ID of the Search space for other system information, i.e., SIB2 and beyond.
-- Corresponds to L1 parameter 'osi-SearchSpace' (see 38.213, section 10)
-- If the field is absent, the monitoring occasions are derived as described in 38.213, section 10.1 and section 13.
searchSpaceOtherSystemInformation   SearchSpaceId                                             OPTIONAL, -- Need R -- ID of the Search space for paging. Corresponds to L1 parameter 'paging-SearchSpace' (see 38.213, section 10)
-- If the field is absent, the monitoring occasions are derived as described in 38.213, section 10.1 and section 13.
pagingSearchSpace               SearchSpaceId                                                 OPTIONAL, -- Need R -- CORESET configured for random access. When the field is absent the UE uses the CORESET according to pdcchConfigSIB1pdcch-ConfigSIB1
-- which is associated with ControlResourceSetId = 0.
-- Corresponds to L1 parameter 'rach-coreset-configuration' (see 38.211?, section FFS_Section)
ra-ControlResourceSet           ControlResourceSet                                            OPTIONAL, -- Need S
-- ID of the Search space for random access procedure. Corresponds to L1 parameter 'ra-SearchSpace' (see 38.214?, section FFS_Section)
-- If the field is absent, the monitoring occasions are derived as described in 38.213, section 10.1 and section 13.
ra-SearchSpace                  SearchSpaceId                                                 OPTIONAL, -- Need R
...

}

-- TAG-PDCCH-CONFIGCOMMON-STOP
-- ASN1STOP
```

FIG. 2

TERMINAL, RADIO COMMUNICATION METHOD, AND BASE STATION

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a radio base station (for example, eNB (eNode B)) transmits a physical layer control signal (for example, downlink control information (DCI)) to a user terminal (UE (User Equipment)) by using a control channel (for example, PDCCH (Physical Downlink Control Channel).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

Summary of Invention

Technical Problem

For future radio communication systems (for example, NR, 5G, 5G+, Rel. 15 or later versions), studies have been conducted to allow a user terminal to monitor (or search) a control resource set (CORESET), which includes allocation candidate regions of a control channel, to detect DCI.

For the future radio communication systems, studies have also been conducted on reporting, to a user terminal (UE), of configuration information of the CORESET and included in UE-specific configuration information (for example, configuration information used to configure UE-specific PDCCH parameters (also referred to as UE-specific PDCCH configuration information, PDCCH-Config, or the like).

However, with simple transmission of the CORESET configuration information included in the UE-specific PDCCH configuration information (PDCCH-Config), the user terminal may fail to appropriately configure the CORESET. As a result, DCI mapped into the CORESET may fail to be appropriately detected.

The present invention has been made in view of the above, and it is an object of the present invention to provide a user terminal and a radio communication method capable of appropriately configuring a CORESET.

Solution to Problem

A user terminal according to an aspect of the present disclosure includes a receiving section that receives configuration information of a control resource set, included in common configuration information used to configure a cell-specific downlink control channel parameter, and a control section that controls configuration of the control resource set, based on the configuration information.

Advantageous Effects of Invention

According to an aspect of the present disclosure, the user terminal can appropriately configure a CORESET.

BRIEF DESCRIPTION OF DRAWINGS

FIG. 1 is a diagram to show an example of CORESET configuration information;

FIG. 2 is a diagram to show an example of PDCCH-ConfigCommon according to the present embodiment;

DESCRIPTION OF EMBODIMENTS

Figure 3:
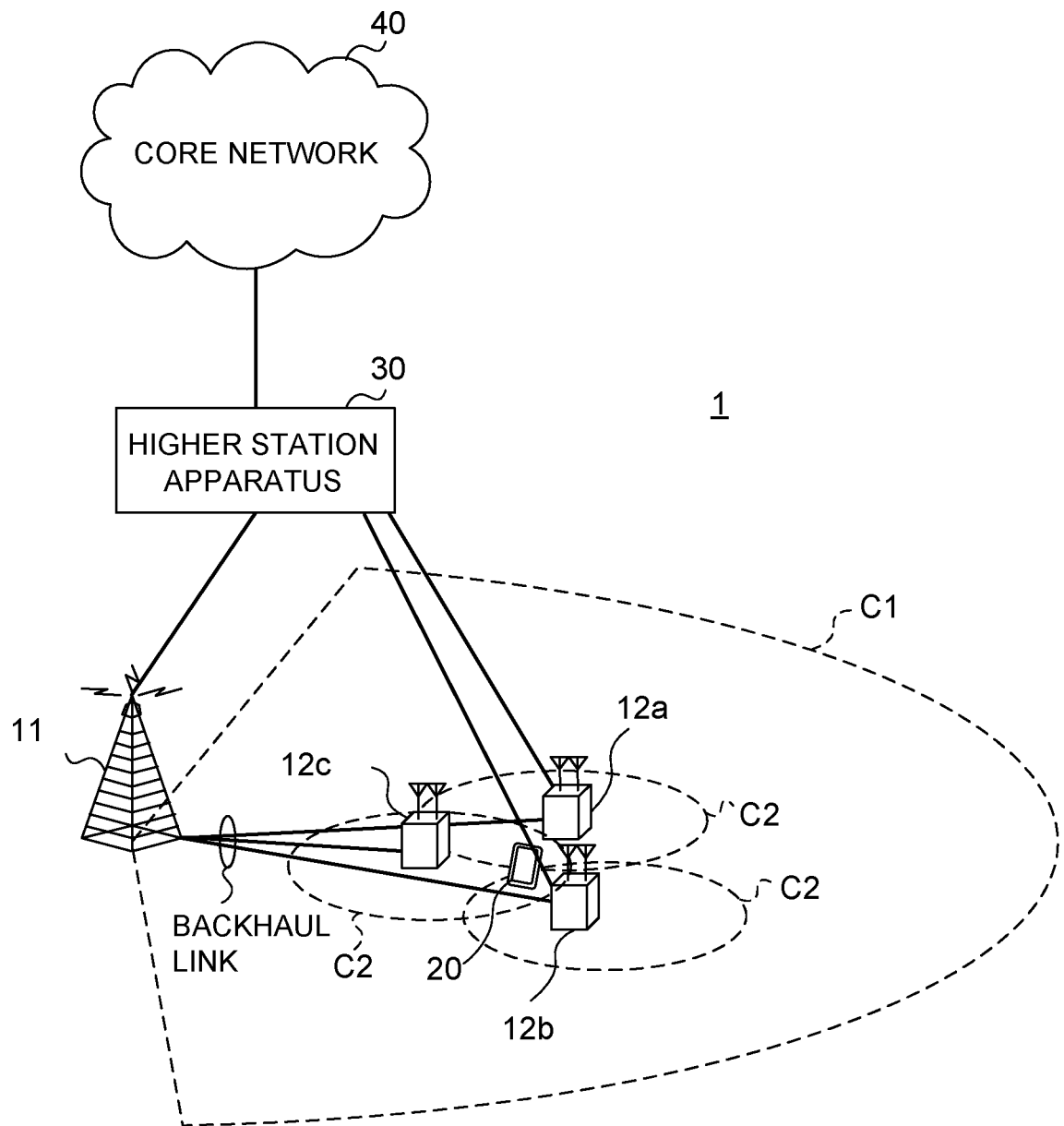
FIG. 3 is a diagram to show an example of a schematic structure of a radio communication system according to the present embodiment.

For future radio communication systems (for example, NR, 5G, 5G+, Rel. 15 or later versions), studies have been conducted on utilization of a control resource set (CORESET) for transmission of a physical layer control signal (for example, downlink control information (DCI)) from a radio base station (which may be also referred to, for example, as a "BS (Base Station)," a "transmission/reception point (TRP)," an "eNB (eNodeB)," a "gNB (NR NodeB)," and so on) to a user terminal.

The CORESET is an allocation candidate region for a control channel (for example, PDCCH (Physical Downlink Control Channel)). The CORESET may include a certain frequency domain resource and time domain resource (for example, one or two OFDM symbols). The PDCCH (or DCI) is mapped to a certain resource unit in the CORESET.

The certain resource unit may be, for example, at least one of a control channel element (CCE), a CCE group including one or more CCEs, a resource element group (REG) including one or more resource elements (REs), one or more REG bundles (REG group), and a physical resource block (PRB).

The user terminal monitors (blind decodes) DCI mapped to a certain resource unit in the CORESET (or a search space in the CORESET) to detect DCI for the user terminal.

To the user terminal, configuration information of a CORESET (that may also be referred to as CORESET configuration information, CORESET-config, ControlResourceSet information element (IE), ControlResourceSet, or the like) is reported from the radio base station. The user terminal configures one or more CORESETs, based on the CORESET configuration information. For example, the CORESET configuration information may be used to configure at least one of time domain region and frequency domain region (time/frequency domain region) for the CORESET that is searched for DCI.

FIG. 1 is a diagram to show an example of the CORESET configuration information. As shown in FIG. 1, the CORESET configuration information may include, for example, at least one of the following types of information (parameters).

Identifier of the CORESET (ControlResourceSetId).

Frequency resources for the CORESET (frequency DomainResources).

Time resources for the CORESET (duration). For example, the duration may be constituted with one or more symbols.

Type of mapping between the CCE and the REG (CCE-REG mapping type (cce-REG-MappingType)). For example, the CCE-REG mapping type may indicate "interleaved" or "noninterleaved."

Size of the REG bundles (reg-Bundle Size, CORESET-REG-bundle-size)

Size of an interleaver for the CORESET (interleverSize, CORESET-interleaver-size)

Index of a shift amount for interleaving (shift index, shiftIndex, CORESET-shift-index).

Precoder granularity in the frequency domain (precoder-Granularity, CORESET-precoder-granularity). The granularity is specified to be the same as the size of the REG bundle or specified as all resource blocks.

State of a transmission configuration indication (TCI) for a PDCCH (TCI state). The TCI state may indicate (include) information related to quasi collocation (QCL) of the PDCCH (also referred to as QCL information, QCL information for the PDCCH, or the like). The QCL information for the PDCCH may be, for example, information related to the QCL between the PDCCH (or a DMRS port for the PDCCH) and a downlink reference signal (DL-RS) in the CORESET, and may include, for example, at least one of information related to a DL-RS having a QCL relationship (DL-RS-related information) and information indicating the above-described QCL type (QCL type information).

Activation/deactivation of a TCI field.

Studies have been conducted on reporting, from the radio base station to the user terminal, of the CORESET configuration information included in configuration information specific to the user terminal (UE) (for example, configuration information used to configure a UE-specific PDCCH parameter (also referred to as UE-specific PDCCH configuration information, PDCCH-Config, or the like). The PDCCH-Config may be reported to the user terminal, for example, by higher layer signaling.

However, with simple transmission of the CORESET configuration information included in the UE-specific PDCCH configuration information (PDCCH-Config), the user terminal may fail to appropriately detect, during a certain procedure, DCI mapped into the CORESET. Specifically, during at least one of the procedures below, the DCI mapped into the CORESET may fail to be appropriately detected.

Handover (HO) for switching a radio base station to which a user terminal is connected.

Random access (RA).

Addition of a secondary cell (SCell) in carrier aggregation (CA).

Addition of an SCell in a master cell group (MCG) or a secondary cell group (SCG) in Dual Connectivity (DC). Note that DC may be, for example, EC-DC (E-UTRA NR Dual Connectivity with MCG using E-UTRA and SCG using NR) or DR of an MCG and an SCG using NR.

Addition of a primary secondary cell (PSCell) in an SCG in DC.

Paging.

For the future radio communication systems, studies have also been conducted on transmission of configuration information by the radio base station, the configuration information being used to configure cell specific (that is, user terminal (UE)-common) PDCCH parameters (also referred to as common configuration information, UE-common PDCCH configuration information, PDCCH-ConfigCommon, or the like).

Thus, the inventors of the present invention come up with an idea to enable appropriate detection of DCI mapped into the CORESET even during a certain procedure (for example, an SCell and/or a PSCell in the above-described HO, RA, CA, and DC (including EN-DC)) by reporting, to the user terminal, of the CORESET configuration information included in the PDCCH-ConfigCommon.

The present embodiments will be described in detail with reference to the drawings as follows.

In the present embodiment, the user terminal receives CORESET configuration information (configuration information of a control resource set) included in PDCCH-ConfigCommon (common configuration information used to configure a cell-specific downlink control channel parameter). The user terminal controls configuration of the CORESET (control resource set), based on the CORESET configuration information.

The user terminal may receive the PDCCH-ConfigCommon including the CORESET configuration information in a system information block (SIB, for example, SIB1). The user terminal may receive, by higher layer signaling, the PDCCH-ConfigCommon including the CORESET configuration information in at least one of the handover procedure, the secondary-cell addition procedure, and the primary-secondary-cell addition procedure.

FIG. 2 is a diagram to show an example of the PDCCH-ConfigCommon according to the present embodiment. As shown in FIG. 2, the PDCCH-ConfigCommon may include one or more types of CORESET configuration information (ControlResourceSet) (for example, first and second CORESET configuration information described below). Each CORESET configuration information may include at least one of the types of information (parameters) described with respect to FIG. 1.

For example, the first CORESET configuration information included in the PDCCH-ConfigCommon may be used for a procedure for receiving at least one of SIB1, OSI, and paging. Specifically, the user terminal may configure a CORESET, based on first CORESET configuration information, and receive at least one of SIB1, OSI, and paging, based on the DCI detected in the CORESET. For example, the user terminal may use downlink shared channel (PDSCH (Physical Downlink Shared Channel)) scheduled by the DCI to receive at least one of SIB1, OSI, and paging.

Accordingly, the first CORESET configuration information may include at least one of CORESET configuration information for SIB1 (ControlResourceSetSIB1, SIB1-ControlResourceSet), CORESET configuration information for the OSI (ControlResourceSetOtherSystemInformation, OtherSystemInformation-ControlResourceSet), and CORESET configuration information for the paging (ControlResourceSetPagin, Paging-ControlResourceSet).

For example, the second CORESET configuration information included in the PDCCH-ConfigCommon may be used for a procedure for the random access. Specifically, the user terminal may configure a CORESET, based on second CORESET configuration information, and receive at least one of a random access response (RAR, also referred to as message 2 or the like) and a contention resolution message (also referred to as message 4), based on the DCI detected in the CORESET. For example, the user terminal may use the PDSCH scheduled by the DCI to receive at least one of messages 2 and 4.

Thus, the second CORESET configuration information may include CORESET configuration information for RA (ControlResourseSetRandomAccess or ra-ControlResourceSet).

As shown in FIG. 2, the PDCCH-ConfigCommon may include at least one of the following types of information (parameters).

Configuration information (that may be also referred to as search space configuration information, CommonSearchSpace, SearchSpace, SeacrchSpace information element (IE), or the like) of a search space (for example, a search space common to one or more user terminals). The search space configuration information will be described below.

Identifier of a search space (also referred to as a search space ID (Identifier), searchSpaceSIB1, SearchSpaceId, or the like) for DCI used to schedule at least one of SIB1 and RMSI.

Identifier of a search space (also referred to as a search space ID, searchSpaceOtherSystemInformation, osi-SearchSpace, SearchSpaceId, or the like) for DCI used to schedule other system information (for example, SIB2).

Identifier of a search space (also referred to as a search space ID, pagingSearchSpace, paging-SearchSpace, SearchSpaceId, or the like) for DCI used to schedule the paging.

Identifier of a search space (also referred to as a search space ID, RASearchSpace, ra-SearchSpace, SearchSpaceId, or the like) for DCI used to schedule at least one of messages 2 and 4 in the random access procedure.

The PDCCH-ConfigCommon configured as described above may be included in system information (for example, SIB1). SIB1 may include information common to user terminals accessing a cell (for example, the position (ssb) of a time domain in which an SSB is transmitted in an SS (Synchronization Signal) burst set (ssb-PositionsisInBurst), a transmission period of SSBs (Synchronization Signal Blocks), a UL/DL configuration in TDD, and so on). The SSB is a block including a synchronization signal and/or a broadcast channel.

Note that the PDCCH-ConfigCommon may be included in the system information other than the SIB (for example, an MIB (Master Information Block), RMSI (Remaining Minimum System Information), and OSI (Other System Information)).

(Radio Communication System)

Hereinafter, a structure of a radio communication system according to the present embodiment of the present disclosure will be described. In this radio communication system, the radio communication method according to each embodiment of the present disclosure described above may be used alone or may be used in combination for communication.

FIG. 3 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LIE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 4:
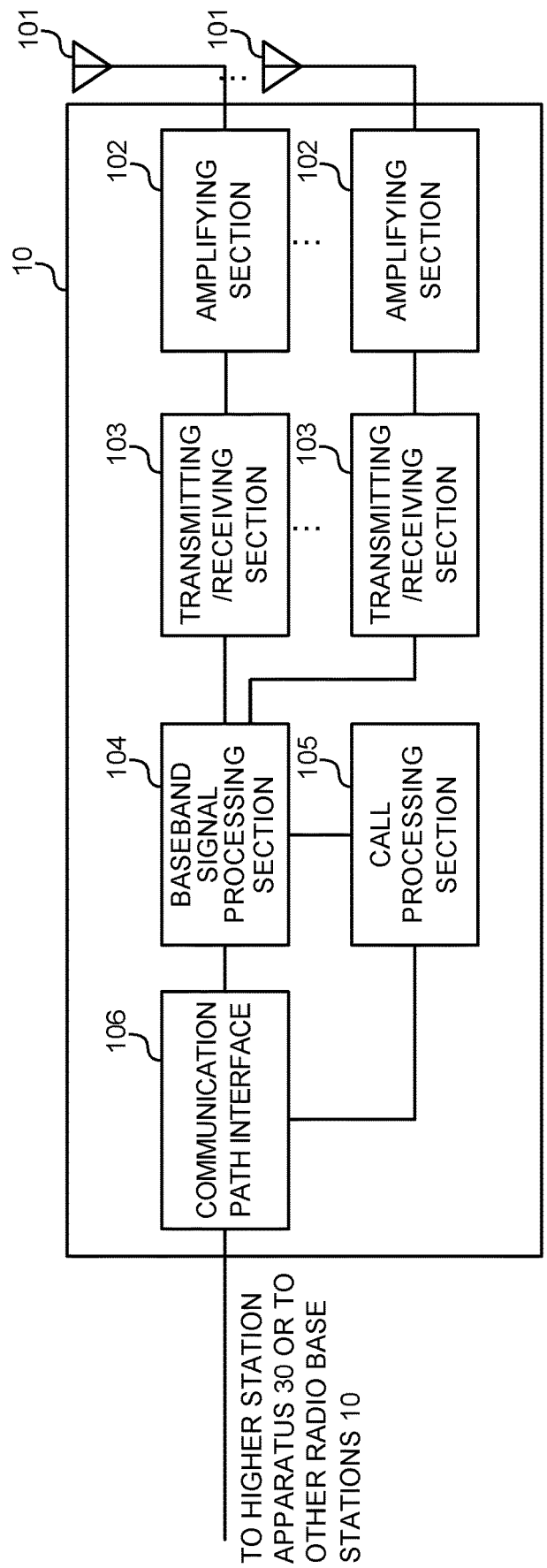
FIG. 4 is a diagram to show an example of an overall structure of a radio base station according to the present embodiment.

FIG. 4 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may transmit downlink control information (for example, DCI) using a control resource set (CORESET) associated with a specific search space.

The transmitting/receiving sections 103 may transmit configuration information of a control resource set (CORESET configuration information), the configuration information being included in common configuration information used to configure a cell-specific downlink control channel parameter. The transmitting/receiving sections 103 may receive the common control information included in the system information block (SIB) or transmit, by higher layer signaling, the common configuration information in at least one of the handover procedure, the secondary-cell addition procedure, and the primary-secondary-cell addition procedure.

Figure 5:
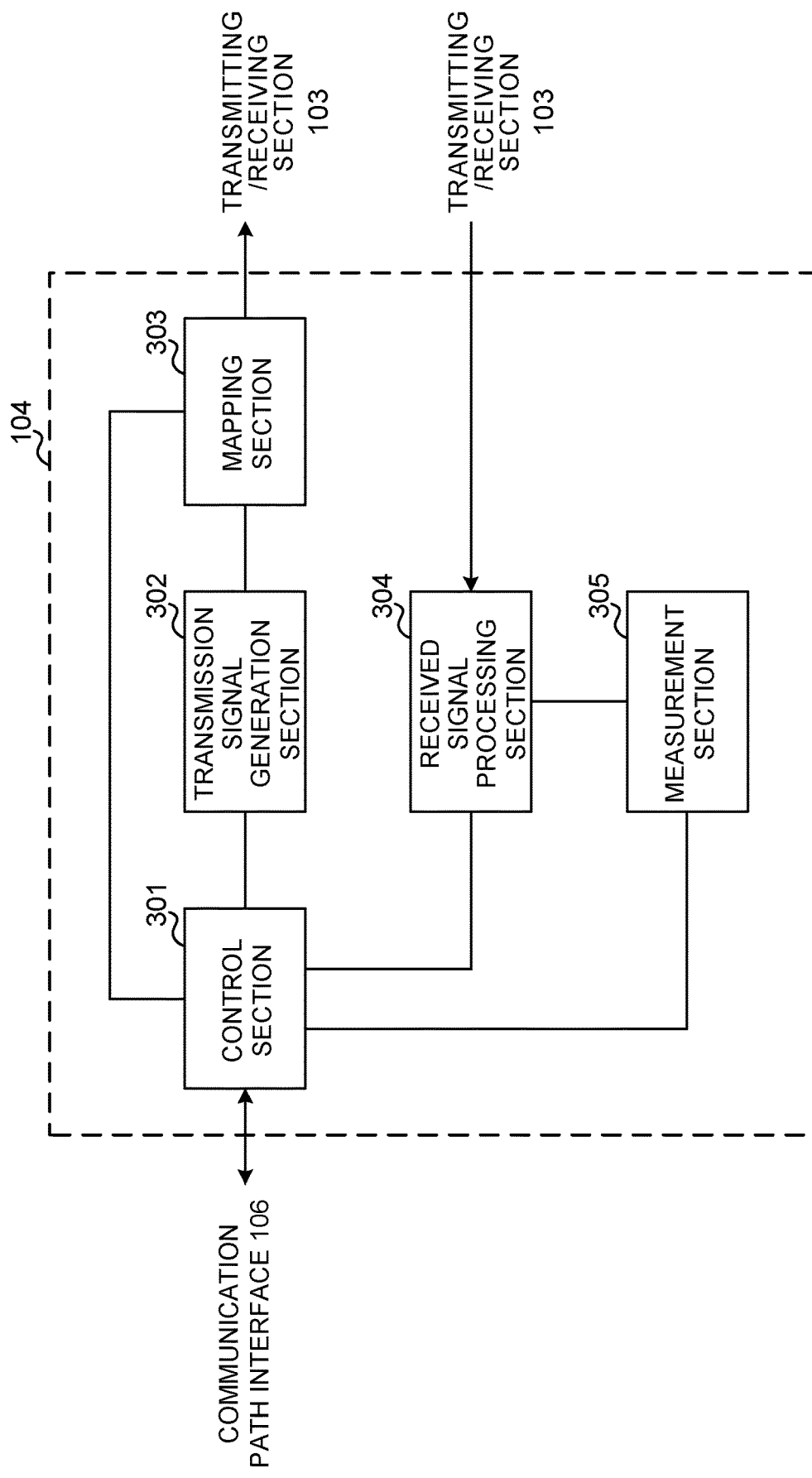
FIG. 5 is a diagram to show an example of a functional structure of the radio base station according to the present embodiment.

FIG. 5 is a diagram to show an example of a functional structure of the radio base station according to the present embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Delivery confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Delivery confirmation information, and so on), a random access preamble (for example, a signal transmitted on the PRACH), an uplink reference signal, and so on.

The control section 301 may perform control of transmitting the DCI by using the CORESET. The control section 301 may perform, in a specific search space, control of generating and transmitting DCI by using a specific DCI format and RNTI corresponding to the format.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 6:
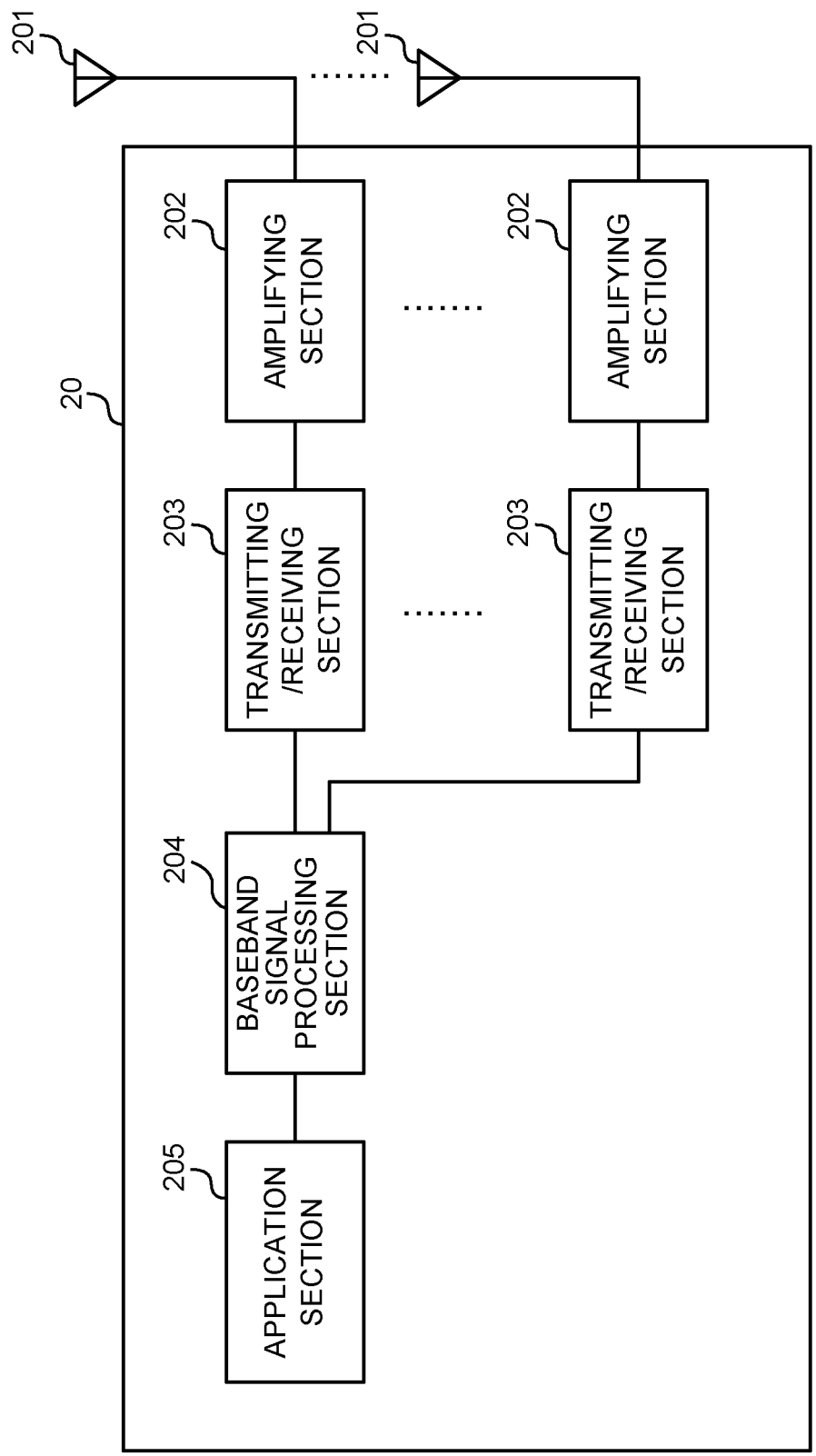
FIG. 6 is a diagram to show an example of an overall structure of a user terminal according to the present embodiment.

FIG. 6 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may use a specific search space determined by the control section 401 described below to monitor a control resource set (CORESET).

The transmitting/receiving sections 203 may receive configuration information of a control resource set (CORESET configuration information), the configuration information being included in common configuration information used to configure a cell-specific downlink control channel parameter. The transmitting/receiving sections 203 may receive the common control information included in the system information block (SIB) or receive, by higher layer signaling, the common configuration information in at least one of the handover procedure, the secondary-cell addition procedure, and the primary-secondary-cell addition procedure.

Figure 7:
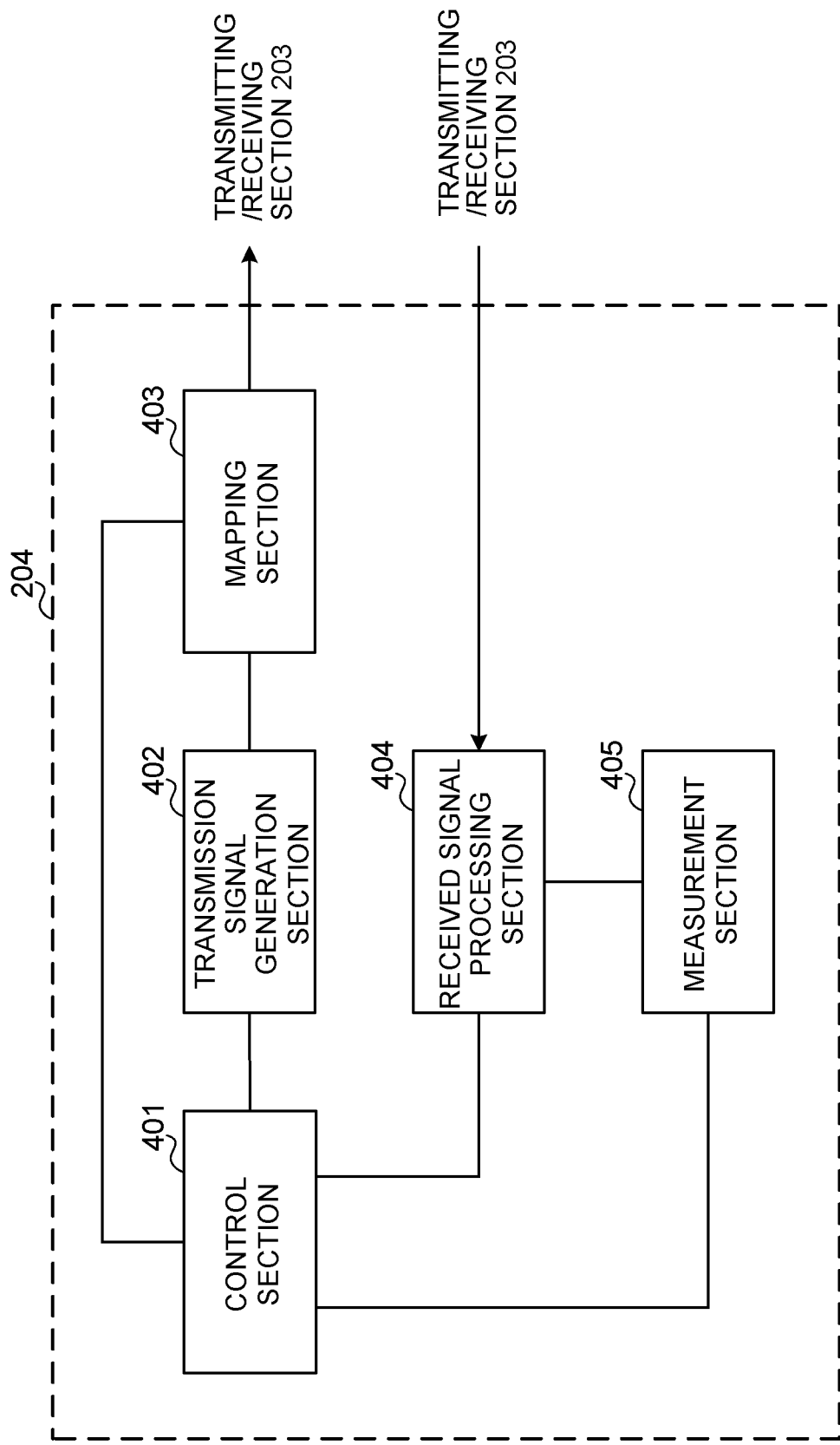
FIG. 7 is a diagram to show an example of a structure of the user terminal according to the present embodiment.

FIG. 7 is a diagram to show an example of a functional structure of the user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control configuration of a control resource set, based on the configuration information of the control resource set included in common configuration information used to configure a cell-specific downlink control channel parameter.

The control resource set may be used to search for downlink control information used to schedule at least one of system information block (SIB) 1, other system information (OSI), and paging.

The control resource set may be used to search for downlink control information used to schedule messages in the random access procedure.

The control section 401 may be configured to inevitably determine at least two types, the type of a search space for detecting a DCI format CRC (Cyclic Redundancy Check) scrambled with a random access RNTI (Radio Network Temporary Identifier) and the type of a user terminal-specific search space (UE-SS), based on one or more search space configurations Here, the type of the UE-SS may indicate the UE-SS. In other words, the UE-SS may not be configured to further include a plurality of types. The search space type information may be information indicating the C-SS or the UE-SS.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) on received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals resulting from the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 8:
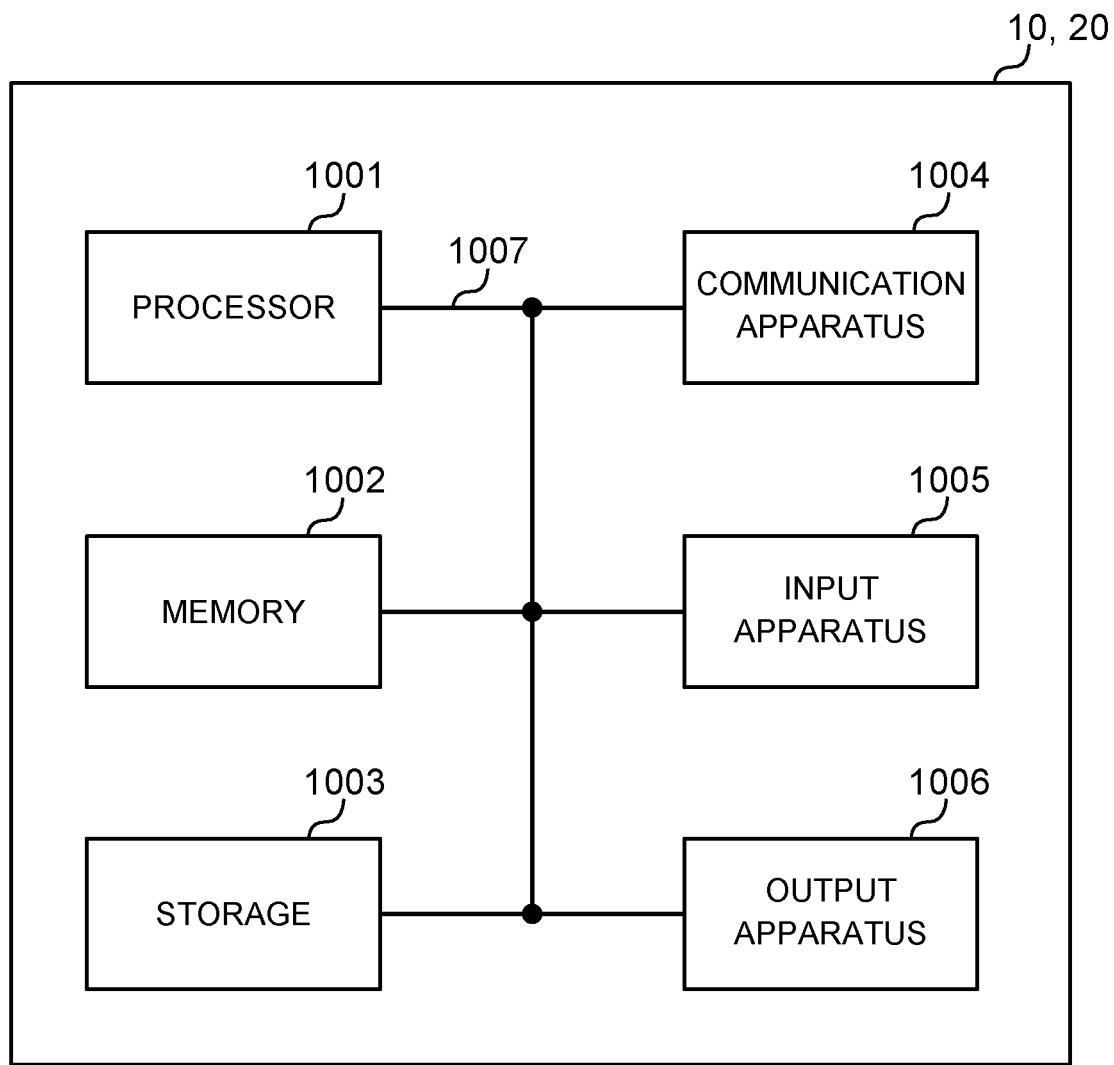
FIG. 8 is a diagram to show an example of a hardware structure of the radio base station and the user terminal according to the present embodiment.

For example, a radio base station, a user terminal, and so on according to the present embodiment of the present disclosure may function as a computer that executes the processes of the radio communication method of the present disclosure. FIG. 8 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

What is claimed is:

1. A terminal comprising:
   a receiver that receives configuration information comprising control resource set (CORESET) configuration information, the configuration information being used for configuring a cell-specific parameter for a downlink control channel; and
   a processor that determines a CORESET based on the CORESET configuration information,
   wherein the receiver receives paging based on downlink control information that is monitored by the processor in the CORESET.

2. The terminal according to claim 1, wherein the processor determines at least one of a time domain and a frequency domain of the CORESET based on the CORESET configuration information.

3. The terminal according to claim 2, wherein the receiver receives a message for random access procedure based on the downlink control information that is monitored by the processor in the CORESET.

4. The terminal according to claim 2,
   wherein the receiver receives the configuration information contained in a system information block (SIB), or
   wherein the receiver receives the configuration information via higher layer signaling in at least one of a handover procedure and a secondary cell adding procedure.

5. The terminal according to claim 1, wherein the receiver receives a message for random access procedure based on the downlink control information that is monitored by the processor in the CORESET.

6. The terminal according to claim 1,
   wherein the receiver receives the configuration information contained in a system information block (SIB), or
   wherein the receiver receives the configuration information via higher layer signaling in at least one of a handover procedure and a secondary cell adding procedure.

7. A radio communication method comprising:
   receiving configuration information comprising control resource set (CORESET) configuration information, the configuration information being used for configuring a cell-specific parameter for a downlink control channel; and
   determining a CORESET based on the CORESET configuration information,
   wherein paging is received based on downlink control information that is monitored in the CORESET configured by the CORESET configuration information.

8. A base station comprising:
   a processor that controls a control resource set (CORESET); and
   a transmitter that transmits configuration information comprising CORESET configuration information, the configuration information being used for configuring a cell-specific parameter for a downlink control channel,
   wherein the transmitter transmits paging based on downlink control information that is monitored in the CORESET configured by the CORESET configuration information.

9. A system comprising a base station and a terminal, wherein:
   the base station comprises:
      a transmitter that transmits configuration information comprising control resource set (CORESET) configuration information, the configuration information being used for configuring a cell-specific parameter for a downlink control channel, and
   the terminal comprises:
      a receiver that receives the configuration information comprising the CORESET configuration information; and
      a processor that determines a CORESET based on the CORESET configuration information,
      wherein the receiver receives paging based on downlink control information that is monitored by the processor in the CORESET.

* * * * *